No. 742,582.

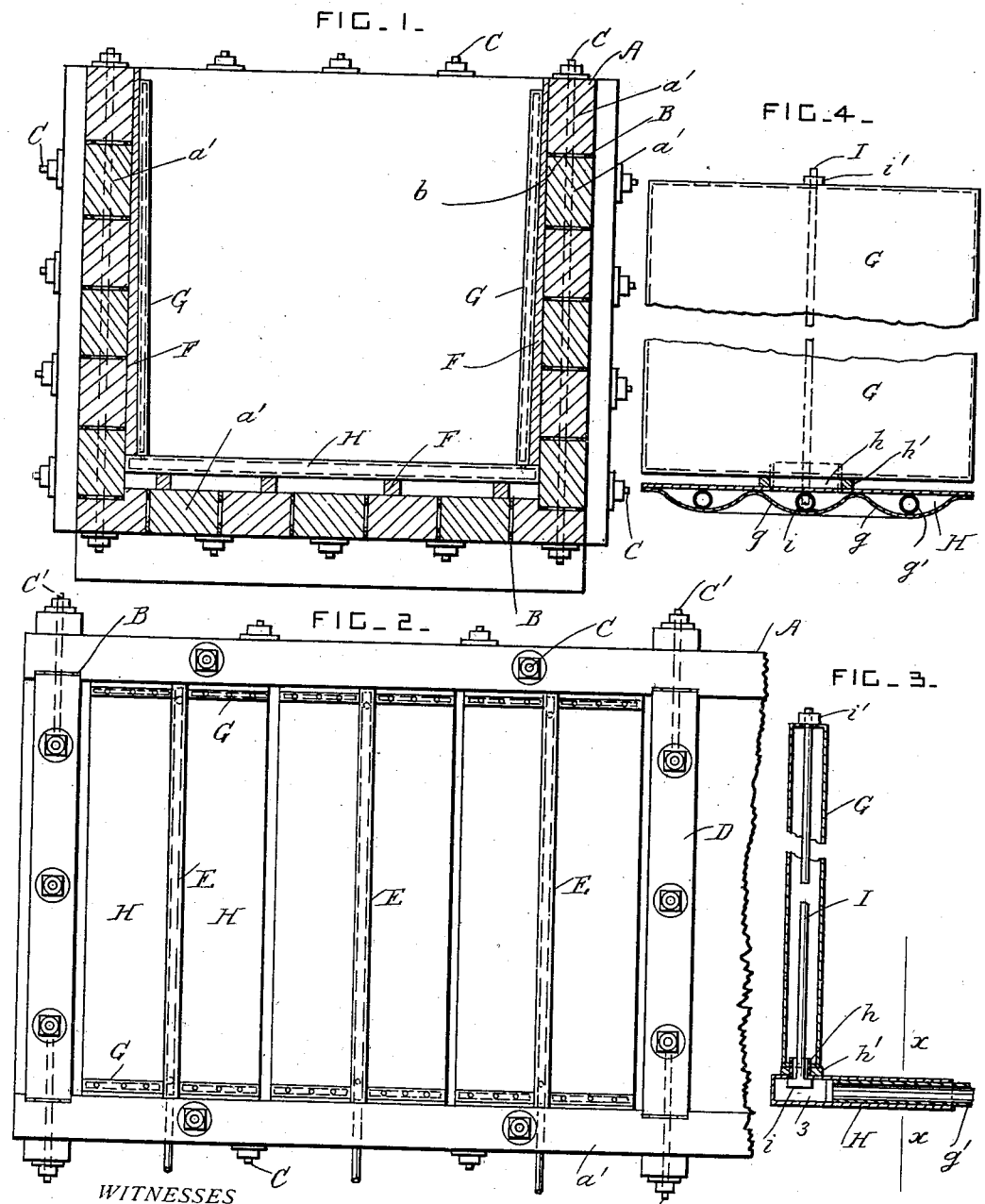

Patented October 27, 1903.

UNITED STATES PATENT OFFICE.

THOMAS H. BUTLER, OF BALTIMORE, MARYLAND.

FREEZING-TANK FOR ICE-MACHINES.

SPECIFICATION forming part of Letters Patent No. 742,582, dated October 27, 1903.

Application filed December 12, 1902. Serial No. 134,921. (No model.)

*To all whom it may concern:*

Be it known that I, THOMAS H. BUTLER, a citizen of the United States, residing at Baltimore city, State of Maryland, have invented certain new and useful Improvements in Freezing-Tanks for Ice-Machines; and I do hereby declare the following to be a full, clear, and exact description of the invention, such as will enable others skilled in the art to which it appertains to make and use the same.

This invention relates to freezing-tanks for ice-machines; and it consists in the novel construction and combination of the parts hereinafter fully described and claimed.

In the drawings, Figure 1 is a cross-section through a freezing-tank constructed according to this invention. Fig. 2 is a partial plan view of the same. Fig. 3 is a vertical section of portions of the thawing-chambers, drawn to a larger scale. Fig. 4 is a cross-section taken on the line $x\ x$ in Fig. 3.

The freezing-tank A may be constructed of any approved material; but in carrying out this invention it is preferably formed of wood. As these freezing-tanks are large and contain a great weight of water, the wood is cut into the form of rectangular logs $a'$, which are built up side by side and one above the other, so as to form a tank of the required size. Packing material B is placed between the logs of wood and is compressed by means of bolts C, which are passed transversely through holes in the logs and which are provided with suitable nuts, so that the packing is tightly compressed between the logs, and the tank is thereby rendered water-tight. In this manner no calking is required. As the water-pressure is inside the tank, all calking would have to be done on the inside of the tank, and same cannot be done satisfactorily because of the inaccessibility of parts of the inside of the tank, especially after the freezing-plates and thawing-chambers have been placed in position.

The packing B is preferably formed of india-rubber, and it is placed between the logs in the form of sheets or plates having openings $b$ at their middle parts, so that the packing extends around the logs adjacent to their side edges.

The bolts C pass through the openings $b$ in the sheets of packing material and as many bolts are used as are found requisite. In order to avoid unnecessary labor in boring auger-holes, and also to avoid conflict of bolts, eyebolts $C'$ are used wherever convenient, as at the sides of the tank. These eyebolts are arranged horizontally and their eyes engage with the vertical bolts C at the ends of the tank.

Each freezing-tank is divided into sections by partitions D, which are similar to the ends of the tank. Each section is practically a complete freezing-tank in itself; but material is saved by making the tanks long and dividing them into sections by partitions.

E represents the freezing-plates secured in the tank and arranged crosswise of it. The tank-section shown in Fig. 2 has three freezing-plates; but any desired number may be used. These freezing-plates are of any approved construction used for forming ice by what is known as the "plate" system. Each freezing-plate preferably consists of a chamber containing pipe-coils, through which refrigerated brine is conducted in any approved manner.

The water is frozen in the tank by contact with the freezing-plates, and the cakes of ice are subsequently detached from the freezing-plates by admitting hot fluid to the freezing-plates in place of the refrigerated brine.

In order to prevent the ice from adhering to the sides and bottom of the tank, thawing-chambers G and H are provided at the sides and bottom of the tank, respectively. The bottom chambers H are provided with corrugations $g$, which support the upper plates of the said chambers, and tubular distance-pieces $g'$ are inserted in the corrugations, so as to support the upper plates at intermediate points. The corrugations and distance-pieces prevent the upper plates from being bent or crushed in by the ice above them. At times the weight of the ice may come wholly upon these upper plates, or an ice-cake may be broken in lifting it out, so that it is necessary that the bottom chambers be made so as to resist pressure and impact. The corrugations and distance-pieces do not extend for the full length of the chambers H, so that passages 3 are formed at the ends of the chambers, which establish communication between all the internal spaces of the chambers. F is packing between the tank and the thawing-chambers. The bottom chambers are provided with upwardly-projecting nozzles $h$ at their ends, which engage with holes in the bottoms of the side chambers G. These nozzles $h$ are preferably oblong in form, and packing material $h'$ is arranged around them, if desired, or the nozzles and holes are constructed in any improved way so as to make water-tight joints.

I represents bolts having T-shaped lower ends $i$, which are dropped through the nozzles and are then turned a quarter around, so as to engage with the bottom chambers. The bolts I pass through the side chambers G and have nuts $i'$ at their upper ends, so that the bottom chambers and the side chambers may be drawn together to form water-tight joints.

After the cakes of ice have been formed in the tank hot fluid is admitted to the chambers G and H, which are in communication through the nozzles $h$, and the surfaces of the ice-cakes are thawed, so that the ice-cakes can be lifted out of the tank by suitable anchor-bars and hoisting mechanism. The hot fluid is subsequently drained off from the thawing-chambers through suitable pipes and faucets, which are not shown.

Wooden tanks formed in this manner are cheaper to construct than iron tanks. They never become rusty, and they are more easily shipped in separate parts or sections to distant parts and put together where required for use.

I do not herein claim the construction of the tank itself, as the same is described and claimed in a divisional application filed April 4, 1903, Serial No. 151,160.

What I claim is—

1. The combination, with a freezing-tank, of a bottom thawing-chamber arranged in the said tank, side thawing-chambers arranged over the end portions of the said bottom chamber, water-tight nozzles connecting the said bottom and side chambers, and fastening-bolts which pass through the said side chambers and nozzles and which engage with the said bottom chamber.

2. The combination, with a freezing-tank provided with a freezing-plate, of a bottom thawing-chamber provided with oblong nozzles at its end portions, side thawing-chambers having holes which engage with the said nozzles, and bolts which pass through the said side chambers and nozzles and which hold the said chambers in water-tight connection, substantially as set forth.

3. The combination, with a freezing-tank provided with a freezing-plate, of a thawing-chamber provided with corrugations and tubular distance-pieces in the said corrugations which prevent the said chamber from being distorted by pressure or impact, substantially as set forth.

In testimony whereof I affix my signature in presence of two witnesses.

THOMAS H. BUTLER.

Witnesses:
JAMES R. BATE,
J. MILTON LYELL.